US012807059B2

(12) United States Patent
Jung et al.

(10) Patent No.: US 12,807,059 B2
(45) Date of Patent: Nov. 24, 2026

(54) MID-GATE ASSEMBLY FOR A VEHICLE

(71) Applicants: HYUNDAI MOTOR COMPANY, Seoul (KR); KIA CORPORATION, Seoul (KR)

(72) Inventors: Doo-Young Jung, Suwon-si (KR); Soo-Bok Kim, Incheon (KR); Hyung-Sik Choi, Seoul (KR); Sung-Won Hong, Incheon (KR); Hoon-Joo Jo, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 323 days.

(21) Appl. No.: 18/594,947

(22) Filed: Mar. 4, 2024

(65) Prior Publication Data

US 2025/0065960 A1 Feb. 27, 2025

(30) Foreign Application Priority Data

Aug. 21, 2023 (KR) ........................ 10-2023-0109410

(51) Int. Cl.

| | |
|---|---|
| ***B62D 33/03*** | (2006.01) |
| ***B60J 1/18*** | (2006.01) |
| ***B60P 3/42*** | (2006.01) |

(52) U.S. Cl.

CPC ............. *B60P 3/423* (2013.01); *B60J 1/1861* (2013.01); *B62D 33/03* (2013.01)

(58) Field of Classification Search

CPC ................................ B60P 3/423; B60J 1/1861

See application file for complete search history.

(56) References Cited

U.S. PATENT DOCUMENTS

| | | | | |
|---|---|---|---|---|
| 3,171,644 A * | 3/1965 | Griswold, Jr. | G05G 1/085 | 74/528 |
| 3,183,740 A * | 5/1965 | Legge | B60J 1/1861 | 74/504 |
| 3,318,049 A * | 5/1967 | Arlauskas | E05F 15/63 | 49/300 |
| 6,416,104 B1 * | 7/2002 | Fisher | B60N 2/3013 | 296/37.16 |
| 6,419,299 B1 * | 7/2002 | Pyo | B60J 1/1861 | 49/377 |

(Continued)

FOREIGN PATENT DOCUMENTS

| | | | |
|---|---|---|---|
| DE | 102008030886 A1 * | 12/2009 | B60J 5/102 |
| FR | 2898841 A1 * | 9/2007 | B60J 1/1861 |

(Continued)

*Primary Examiner* — Catherine A Kelly

(74) *Attorney, Agent, or Firm* — Lempia Summerfield Katz LLC

(57) ABSTRACT

A mid-gate assembly for a vehicle includes: a module frame installed between a passenger compartment and a cargo compartment of a vehicle and spaced apart from a floor of the vehicle; a mid-gate rotatably installed on the floor and configured to selectively close a lower side of the module frame by being rotated by a mid-gate regulator and open the lower side of the module frame by being folded toward the floor; and a back glass installed on the module frame and the mid-gate and configured to be selectively movable upward and downward by a back glass regulator.

19 Claims, 13 Drawing Sheets

(56) References Cited

U.S. PATENT DOCUMENTS

| | | | | |
|---|---|---|---|---|
| 6,422,638 | B1 * | 7/2002 | Carnaghi | B60J 1/1861 49/374 |
| 6,450,566 | B1 * | 9/2002 | Hong | B62D 47/003 296/26.11 |
| 6,454,341 | B2 * | 9/2002 | Tolinski | B60J 5/104 296/106 |
| 6,505,872 | B2 | 1/2003 | Hong | |
| 6,520,562 | B2 * | 2/2003 | Pyo | B62D 47/003 296/147 |
| 6,786,535 | B1 * | 9/2004 | Grzegorzewski | B60N 2/3013 296/37.16 |
| 6,796,600 | B1 * | 9/2004 | Ferer | B60P 3/423 296/37.6 |
| 6,837,529 | B2 * | 1/2005 | Kharod | B60J 1/1853 296/183.1 |
| 7,410,198 | B1 * | 8/2008 | Queener | B60P 3/423 296/24.33 |
| 7,566,094 | B2 * | 7/2009 | Polewarczyk | B60J 1/1861 296/190.11 |
| 7,845,712 | B2 * | 12/2010 | Gordon | B60J 10/80 296/190.11 |
| 10,350,972 | B2 * | 7/2019 | Azzouz | B60J 5/00 |
| 11,912,209 | B2 * | 2/2024 | Zink | B60R 13/08 |
| 2002/0079715 | A1 | 6/2002 | Hong | |
| 2006/0076802 | A1 * | 4/2006 | Voelkert | B60J 1/1861 296/190.11 |
| 2024/0217315 | A1 * | 7/2024 | Wolf | B60J 1/1861 |

FOREIGN PATENT DOCUMENTS

| | | | | |
|---|---|---|---|---|
| KR | 20020050622 A | | 6/2002 | |
| KR | 20060059472 A | * | 6/2006 | B62D 25/12 |

* cited by examiner

MID-GATE ASSEMBLY FOR A VEHICLE

CROSS-REFERENCE TO RELATED APPLICATION

This application claims priority to Korean Patent Application No. 10-2023-0109410, filed on Aug. 21, 2023, and which is incorporated herein by reference in its entirety.

BACKGROUND OF THE DISCLOSURE

Field of the Disclosure

The present disclosure relates to a mid-gate assembly for a vehicle, and more particularly, to a mid-gate assembly for a vehicle that is capable of automatically operating a back glass and a mid-gate, respectively.

Description of Related Art

A vehicle, such as a pick-up truck, includes a passenger compartment in which occupants can sit, and a cargo compartment in which cargo can be loaded. The passenger compartment and the cargo compartment are separated by a mid-gate. In other words, a passenger compartment is provided forward of the mid-gate and a cargo compartment for loading cargo is provided rearward of the mid-gate.

The mid-gate has a back glass typically installed at an upper side thereof to secure rear visibility and the mid-gate is disposed at a lower side of the back glass.

The back glass and the mid-gate are installed in a fixed manner and thus cannot be changed to sufficiently reflect a user's needs. In other words, there is a limitation in expanding openness because the back glass is fixed. Cargo length is restricted by a length of the cargo compartment at the time of loading the cargo.

SUMMARY OF THE DISCLOSURE

Accordingly, the present disclosure is to provide a mid-gate assembly for a vehicle in which a back glass and a mid-gate are independently operable, such that any one of the back glass or the mid-gate is operable or that the back glass and the mid-gate are operable in conjunction with each other, depending on operating modes.

As an embodiment, a mid-gate assembly for a vehicle may include a module frame installed between a passenger compartment and a cargo compartment of a vehicle and spaced apart from a floor of the vehicle. The mid-gate assembly also includes a mid-gate rotatably installed on the floor and configured to selectively close a lower side of the module frame by being rotated by a mid-gate regulator and to open the lower side of the module frame by being folded toward the floor. The mid-gate assembly also includes a back glass installed on the module frame and the mid-gate and configured to be selectively movable upward and downward by a back glass regulator.

Back glass rails may be installed on the module frame, may accommodate two opposite ends of the back glass, and may guide upward and downward movement of the back glass. Back glass channels may be installed on the mid-gate, may accommodate the two opposite ends of the back glass, and may guide the upward or downward movement of the back glass when the back glass is accommodated in the mid-gate. The back glass rails and the back glass channels may be connected to one another when the mid-gate closes the lower side of the module frame.

Rack gears may be provided at the two opposite ends of the back glass and may have teeth formed in a vertical (height) direction of the vehicle. The rack gears may each be accommodated in at least any one of the back glass rail or the back glass channel.

The back glass regulator may be installed on the module frame. The mid-gate assembly may include: driving cables configured to be moved by the back glass regulator; first glass gears rotatably installed on the module frame and configured to be rotated by movements of the driving cables and to engage with the rack gears; and second glass gears rotatably installed on the mid-gate and configured to engage with the rack gears and to operate in conjunction with the first glass gears.

The mid-gate assembly may further include cooperative gears installed on the module frame and configured to engage with the corresponding first glass gears so that the first glass gears and the respective second glass gears rotate in the same direction. The mid-gate assembly may also include matching gears installed on the module frame and configured to be rotated by the respective cooperative gears. The matching gears may be configured to engage with the respective second glass gears when the mid-gate is closed.

A matching portion may be formed on any one of each of the second glass gears or each of the matching gears and may have a tapered cross section and teeth formed along a periphery thereof. An accommodation portion may be formed in the other of each of the second glass gears and each of the matching gears, may accommodate the respective matching portion and engage with the matching portion.

The second glass gears may engage with the matching gears when the mid-gate is closed. The second glass gears may be separated from the matching gears when the mid-gate begins to be folded.

The first glass gears may each include an input gear portion configured to engage with the driving cable, an output gear portion configured to engage with the rack gear, and a cooperative gear configured to engage with the respective cooperative gear.

The driving cables may have a spiral formed along a periphery thereof. The driving cables may be configured to engage with a driving gear of the back glass regulator and then engage with the respective input gear portions to operate the first glass gears.

The input gear portions may be provided in the form of a helical gear.

Guides may be provided on the module frame, may accommodate the driving cables, and may guide movements of the corresponding driving cables.

The mid-gate may be hingedly connected to the floor of the vehicle. The mid-gate may be folded by the mid-gate regulator installed on the floor and open or close a lower side of the module frame.

A back glass holder may be provided at a lower end of the mid-gate and may accommodate a lower end of the back glass when the back glass is maximally moved downward.

A slit may be formed at an upper end of the mid-gate so that the back glass is inserted into the mid-gate via the slit.

The mid-gate assembly may further include a controller configured to control operations of the mid-gate regulator and the back glass regulator.

The mid-gate assembly may further include a mid-gate sensor configured to detect a folding angle of the mid-gate and a back glass sensor configured to detect a height of the back glass.

When the mid-gate is closed, the controller may be configured to move the back glass upward or downward between a first position at which the back glass is maximally moved upward in the module frame and a second position at which the back glass is maximally moved downward in the mid-gate.

The controller may be configured to open the mid-gate when the entire back glass is accommodated in the mid-gate or a lower end of the back glass is positioned to be higher than an upper end of the mid-gate.

In an anti-buffeting mode in which the mid-gate is opened and the back glass is moved downward only by a predetermined height, the controller may be configured to move the back glass downward so that the lower end of the back glass is coincident with a lower end of the module frame.

According to the mid-gate assembly of the present disclosure configured as described above, the back glass may be moved upward or downward by electric power, and the mid-gate may be folded by electric power. Thus, the back glass and the mid-gate may be conveniently operated.

In addition, the back glass and the mid-gate may be operated independently of each other. Thus, the back glass and the mid-gate may be operated in various ways, thereby meeting various needs of the user.

DESCRIPTION OF SPECIFIC EMBODIMENTS

Figure 1:
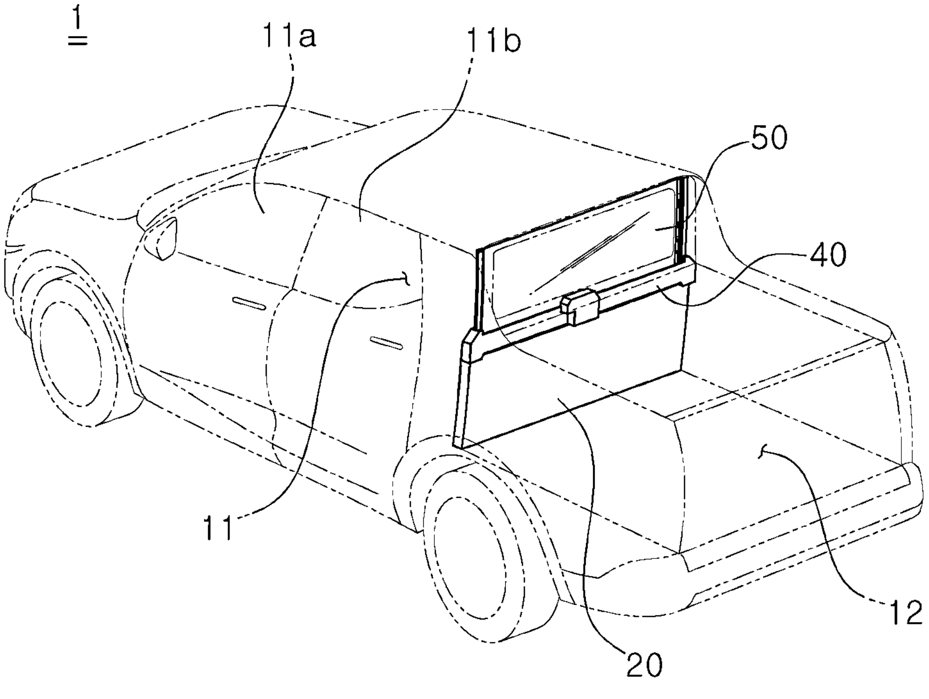
FIG. 1 is a perspective view illustrating a vehicle to which a mid-gate assembly for a vehicle according to the present disclosure is applied.
Figure 2:
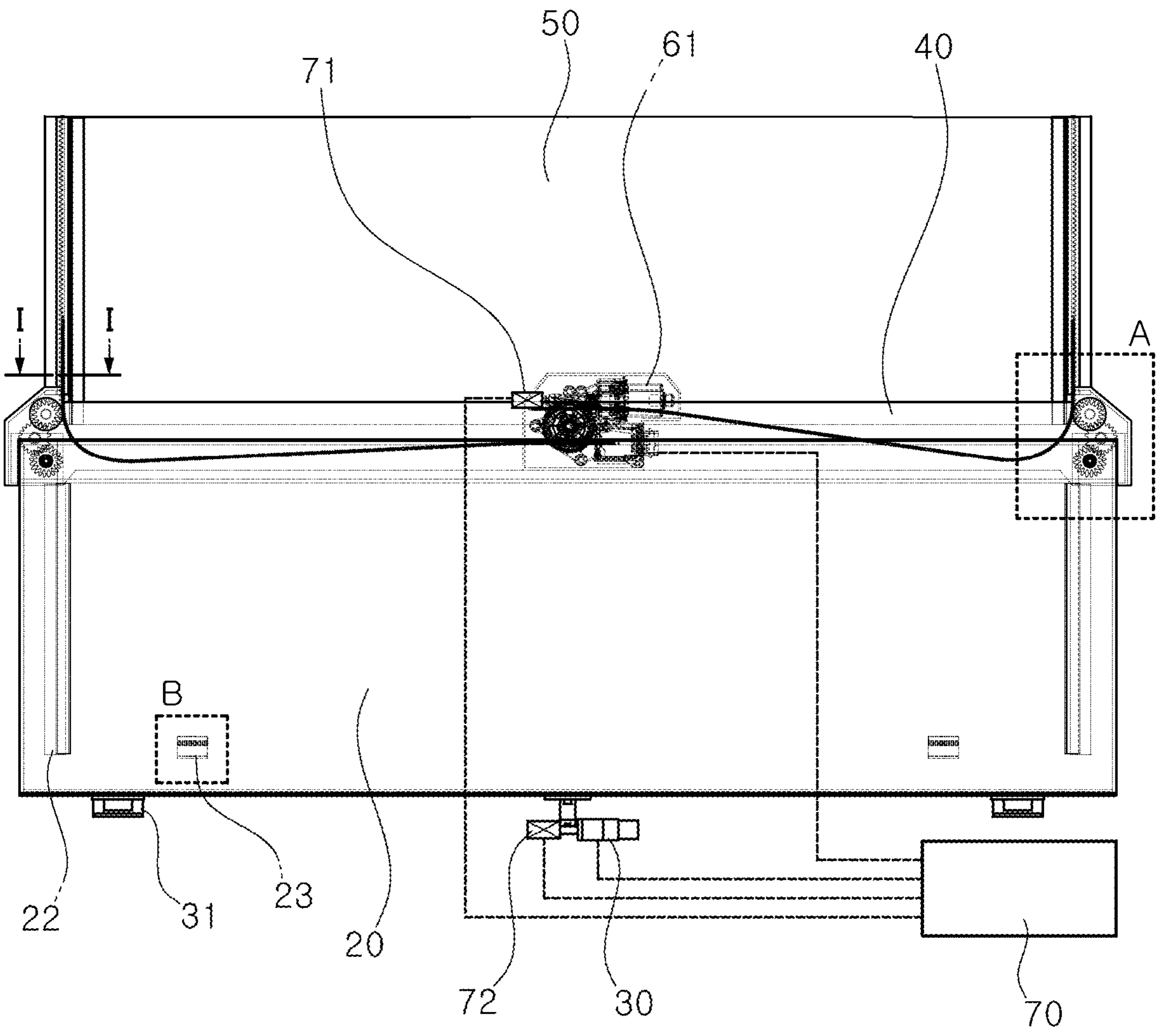
FIG. 2 is a schematic front view illustrating a mid-gate assembly for a vehicle according to the present disclosure.
Figure 3:
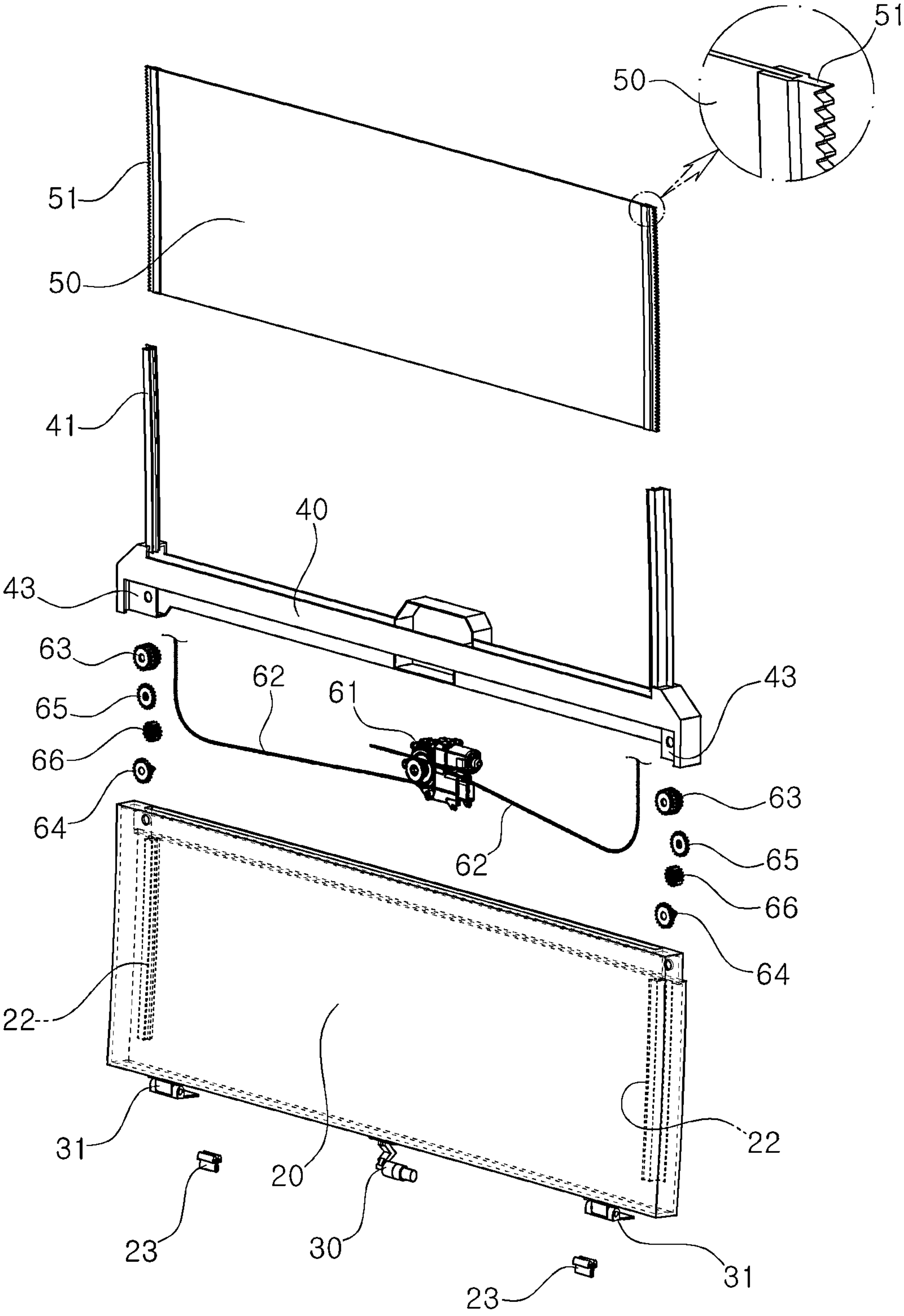
FIG. 3 is an exploded perspective view illustrating a mid-gate assembly for a vehicle according to the present disclosure.

Hereinafter, embodiments of the present disclosure are described in detail with reference to the accompanying drawings. Since these embodiments, as examples, may be implemented in various different forms by those of ordinary skill in the art to which the present disclosure pertains, the present disclosure is not limited to the embodiments described herein.

Hereinafter, a mid-gate assembly for a vehicle according to the present disclosure is described in detail with reference to the accompanying drawings. When a component, device, element, or the like of the present disclosure is described as having a purpose or performing an operation, function, or the like, the component, device, or element should be considered herein as being "configured to" meet that purpose or to perform that operation or function.

The mid-gate assembly for a vehicle according to the present disclosure may include a module frame 40 installed between a passenger compartment 11 and a cargo compartment 12 of a vehicle 1. The mid-frame 40 may be spaced apart from a floor 14 of the vehicle 1. The mid-gate assembly may also include a mid-gate 20 rotatably installed on the floor 14 and configured to selectively close a lower side of the module frame 40 by being rotated by a mid-gate regulator 30 and to open the lower side of the module frame 40 by being folded toward the floor 14. The mid-gate assembly may also include a back glass 50 installed on the module frame 40 and the mid-gate 20 and may be configured to be selectively movable upward and downward by a back glass regulator 61.

The mid-gate 20 may be installed on the floor 14 of the vehicle 1. The mid-gate 20 may be installed between the passenger compartment 11 and the cargo compartment 12 of the vehicle 1 and configured to separate the passenger compartment 11 and the cargo compartment 12.

The mid-gate 20 may be rotatably installed on the floor 14 of the vehicle 1. A lower end of the mid-gate 20 may be installed on the floor 14 and configured to be rotatable by means of a hinge 31 or other type of suitable pivot joint.

The mid-gate 20 may be installed between the passenger compartment 11 and the cargo compartment 12 and configured to be folded downward and inward toward the passenger compartment 11.

The mid-gate 20 has a hollow portion therein to accommodate the back glass 50.

A slit 21 may be formed at an upper end of the mid-gate 20 in a transverse (width) direction of the vehicle so that the back glass 50 may be extended from or retracted into an internal space of the mid-gate 20.

Back glass channels 22 may be formed at two opposite ends, i.e., lateral sides, of an interior of the mid-gate 20. The glass channels 22 may be formed, one each, to surround respective lateral ends or side edges of the back glass 50 in a height direction of the vehicle 1. Therefore, the glass channels 22 guide the lateral ends of the back glass 50 when the back glass 50 may move upward or downward in the mid-gate 20.

Figure 8:
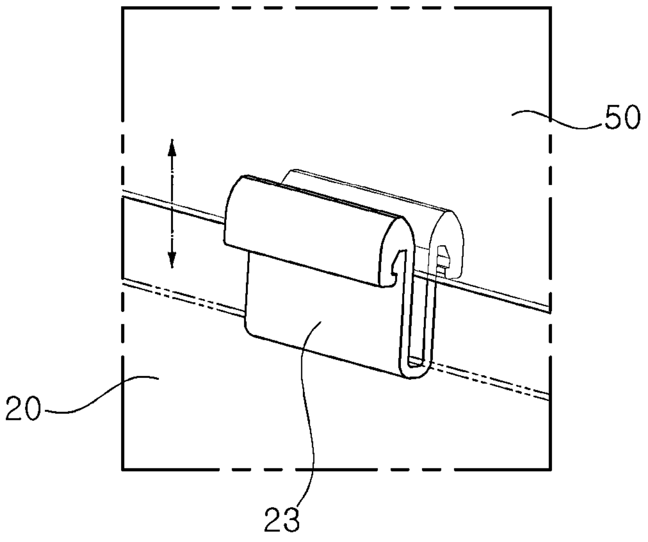
FIG. 8 is a perspective view illustrating detail B in FIG. 2.

Glass holders 23 may be provided at a lower end of the mid-gate 20 (see FIG. 8). The glass holders 23 may hold the lower end of the back glass 50 when the back glass 50 is maximally moved downward. An upper portion or receiving opening of the glass holders 23 may have a width that increases downward so that the back glass 50 may be easily inserted. The remaining part of the glass holders 23, except for the upper portion of the glass holders 23, may be in contact with front and rear surfaces of the back glass 50 to prevent an inadvertent movement of the back glass 50. In addition, the glass holders 23 may be made of a cushioning material to absorb impact when the glass holders 23 holds the lower end of the back glass 50.

The mid-gate regulator 30 may be installed between the mid-gate 20 and the floor 14 and may be configured to rotate the mid-gate 20. The mid-gate regulator 30 may include power transmission members such as a drive motor and a gear or a link, such that the drive motor operates to rotate the mid-gate 20. The mid-gate 20 may serve as a partition wall that separates the passenger compartment 11 and the cargo compartment 12 when the mid-gate 20 closes a portion between the passenger compartment 11 and the cargo compartment 12. The mid-gate 20 does so by standing approximately perpendicularly with respect to the floor 14.

When the mid-gate 20 is rotated and folded downward to overlap the floor 14, the portion between the passenger compartment 11 and the cargo compartment 12 may be opened. Thus, the passenger compartment 11 and the cargo compartment 12 spaces communicate with each other. Therefore, a space of the cargo compartment 12 may extend such that cargo with a length longer than a length of the cargo compartment 12 may be loaded. Hereinafter, the closed state of the mid-gate 20 may mean a state in which the mid-gate 20 stands upright and the open state of the mid-gate 20 may mean a state in which the mid-gate 20 is partially rotated, i.e., folded downward or completely folded.

The module frame 40 may be installed between the passenger compartment 11 and the cargo compartment 12.

When the back glass 50 is moved maximally upward, the module frame 40 may accommodate the two opposite ends or sides and the lower end of the back glass 50. When the mid-gate 20 stands upright, a lower portion of the module frame 40 may adjoin the upper end of the mid-gate 20 to close the portion between the passenger compartment 11 and the cargo compartment 12.

Back glass rails 41 may be provided, one each, at two opposite sides of the module frame 40. The back glass rails 41 may extend in a height direction of the vehicle 1. The back glass rails 41 may hold the respective lateral ends or sides of the back glass 50 and may guide the upward or downward movement of the back glass 50. When the mid-gate 20 is closed, the back glass rails 41 may be connected to the back glass channels 22.

Further, the module frame 40 may have guides 42, one each, configured to accommodate the respective driving cables 62 and may guide the driving cables 62 when the driving cables 62 move. Each guide 42 may support a lateral surface of the corresponding driving cable 62 and may guide the driving cable 62 so that the driving cable 62 moves in a length direction of the driving cable 62 without buckling.

First glass gears 63, cooperative gears 65, and matching gears 66 may be rotatably and respectively installed, one each, at two opposite ends of the module frame 40 and operated by the respective driving cables 62.

In addition, mid-gate seats 43 may be provided, one each, at the lower end on each side of the module frame 40. When the mid-gate 20 is closed, the upper end of the mid-gate 20 may come into contact with the mid-gate seats 43 and the mid-gate 20 may be seated on the module frame 40.

The back glass 50 may be installed on the module frame 40 and the mid-gate 20 and may be configured to be movable upward or downward. A lower portion of the back glass 50 may be positioned in the module frame 40 in a state in which the back glass 50 is moved maximally upward. The entire back glass 50 may be positioned in the mid-gate 20 in a state in which the back glass 50 is moved maximally downward. Meanwhile, in a state in which the back glass 50 is partially moved downward from a maximally raised state or partially moved upward from a maximally lowered state, an upper portion of the back glass 50 may be accommodated in the module frame 40 and the lower portion of the back glass may be accommodated in the mid-gate 20.

Rack gears 51 may be provided, one each, at two opposite ends or sides of the back glass 50. The rack gears 51 may be accommodated in the respective back glass rails 41 and the respective back glass channels 22 and may be configured to move upward or downward. The rack gears 51 may respectively engage with the first glass gears 63 and second glass gears 64, as described below, and move the back glass 50 upward or downward. In addition, the rack gears 51 may be accommodated in at least any one of the respective back glass rail 41 or back glass channel 22 and may be guided by the back glass rail 41 and the back glass channel 22, such that the upward or downward movement of the back glass 50 is guided.

A constituent element for moving the back glass 50 upward or downward may be installed on the module frame 40.

The back glass regulator 61 may be installed on the module frame 40. When power is applied, the back glass regulator 61 may operate to rotate a driving gear 61*a* installed on an output shaft of the back glass regulator 61.

The driving cables 62 coupled to the driving gear 61*a* may transmit driving power of the back glass regulator 61 to the first glass gears 63. A part of each driving cable 62 may be positioned between the back glass regulator 61 and the respective first glass gear 63 and the remaining part of the driving cable 62 may be positioned in the respective guide 42.

The driving cables 62 may be made of a flexible material having elasticity in a direction perpendicular to the length direction substantially without elasticity in the length direction. In addition, a spiral may be formed on an outer surface of the driving cables 62 and may engage with the driving gear 61*a* and the respective first glass gears 63. When the driving gear 61*a* rotates, the driving cables 62 may move to move the back glass 50 upward or downward.

Figure 4:
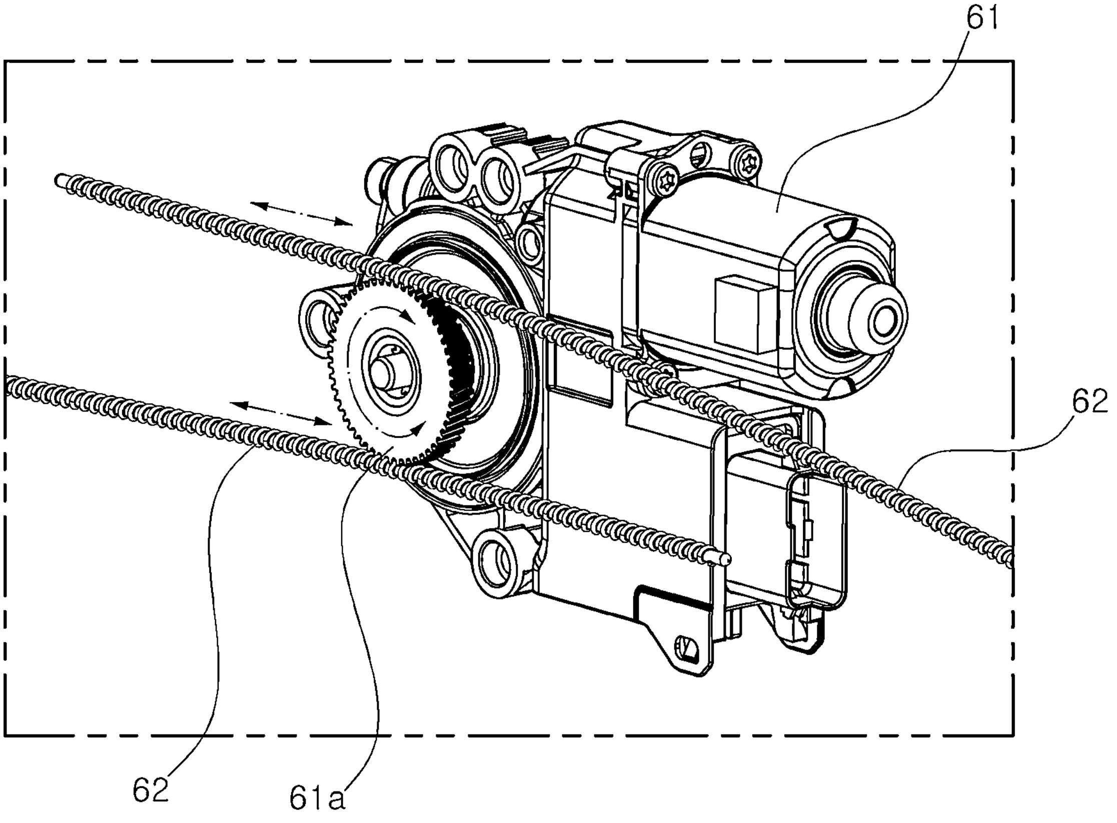
FIG. 4 is a main part perspective view illustrating a connection relationship between a driving cable and a regulator motor of a mid-gate assembly for a vehicle according to the present disclosure.
Figure 5:
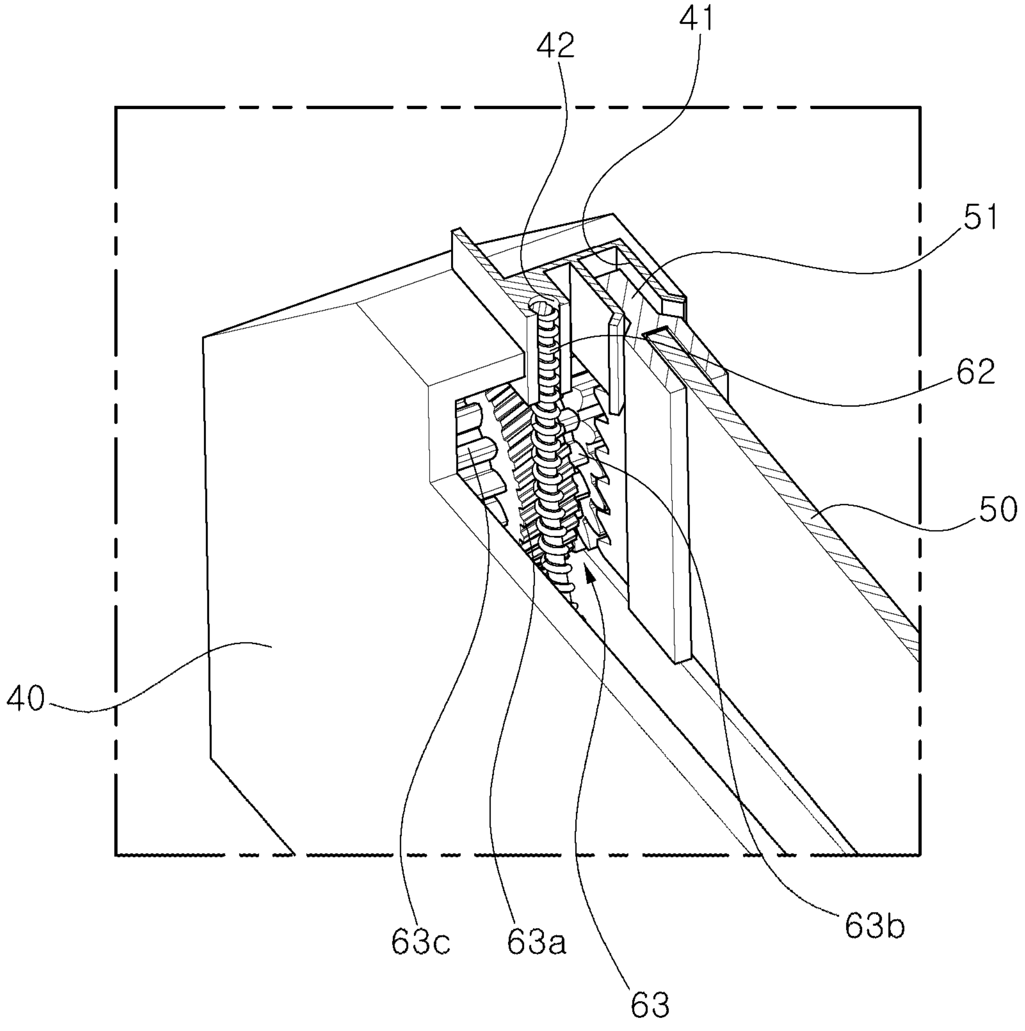
FIG. 5 is a perspective view taken along line I-I in FIG. 2.

The driving cables 62 may be provided as a pair of driving cables 62 to operate the respective rack gears 51 installed at the two opposite ends or sides of the back glass 50. In other words, the two driving cables 62 may independently operate the rack gears 51 respectively positioned at the two opposite left and right sides. However, because the two driving cables 62 need to simultaneously move the rack gears 51 upward or downward, the two driving cables 62 may engage with a periphery of the driving gear 61*a* and may be spaced apart from each other at an interval, as illustrated in FIG. 4.

A portion of each driving cable 62, which is connected to the back glass regulator 61, may be disposed in the width direction of the vehicle 1. A portion of each driving cable 62, which is adjacent to the guide 42 of the module frame 40, may be disposed in the height or vertical direction of the vehicle 1. An arrangement direction of a portion of each driving cable 62, at a position at which the respective first glass gear 63 is positioned, may change from the width direction of the vehicle 1 to the height direction of the vehicle 1. Thus, the driving cable 62 is in contact with the respective first glass gear 63 while surrounding an outer peripheral surface of the first glass gear 63.

The first glass gears 63 may be respectively installed at the two opposite sides of the module frame 40. The first glass gears 63 may be rotatably installed in the module frame 40.

The first glass gears 63 each may have an input gear portion 63*a* configured to engage with the respective driving cables 62, an output gear portion 63*b* configured to engage with the respective rack gear 51, and a cooperative gear portion 63*c* configured to operate in conjunction with the respective second glass gear 64. The input gear portion 63*a*, the output gear portion 63*b*, and the cooperative gear portion 63*c* may be integrated in a single gear or member.

The first glass gears 63 may engage with the driving cables 62 by means of the respective input gear portions 63*a*. Therefore, the first glass gears 63 may rotate when the driving cables 62 move. Because the spiral is formed on the outer portion of the driving cables 62, the input gear portions 63*a* may be provided in the form of a helical gear so as to appropriately engage with the driving cables 62. The input gear portions 63*a* may be provided in the form of a helical gear, which may maintain the position of the back glass 50 while preventing the first glass gears 63 from being rotated reversely by a weight of the back glass 50.

The output gear portions 63*b* may engage with the respective rack gears 51. Therefore, when the first glass gears 63 rotate, the back glass 50 may move upward or downward in the module frame 40.

The cooperative gears 65 may be rotatably installed in the module frame 40. The cooperative gears 65 may engage with the cooperative or corresponding gear portions 63*c* of the first glass gears 63. Thus, the first glass gear 63 and the second glass gear 64 on each side of the mid-gate assembly rotate in the same direction.

The matching gears 66 may be rotatably installed in the module frame 40 and engage with the respective cooperative gears 65. The matching gears 66 serve to transmit driving power to the mid-gate 20 at the time of closing the mid-gate 20.

The second glass gears 64 may be rotatably installed in the mid-gate 20. The first glass gears 63, the cooperative gears 65, and the matching gears 66 may be installed on the module frame 40, whereas the second glass gears 64 may be installed on the mid-gate 20. When the mid-gate 20 is closed, the second glass gears 64 may serve to move the back glass 50 upward or downward in a state in which the back glass 50 is accommodated in the mid-gate 20.

Figure 6:
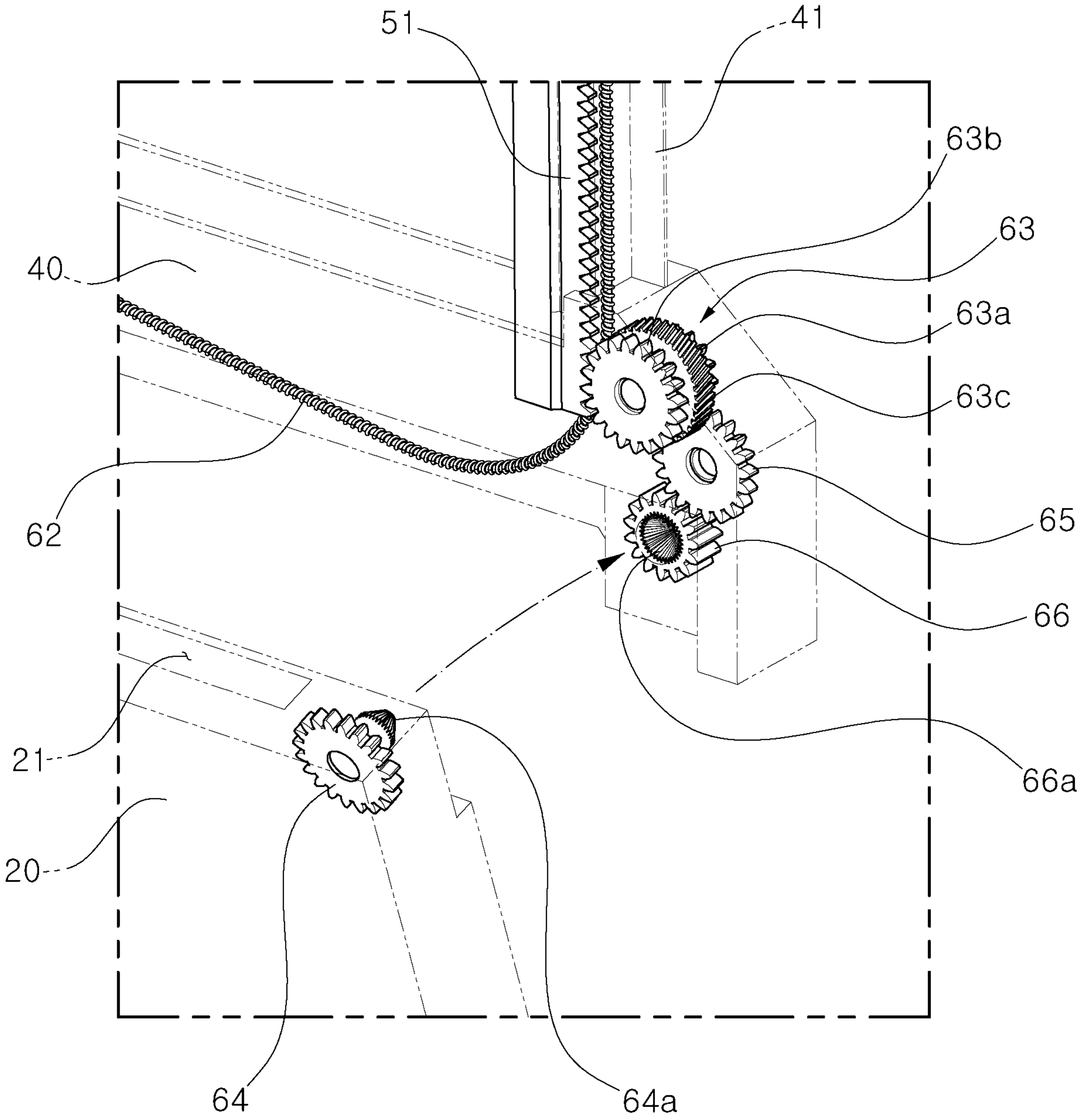
FIG. 6 is a front perspective view and FIG. 7 is a rear perspective view illustrating detail A in FIG. 2.
Figure 7:
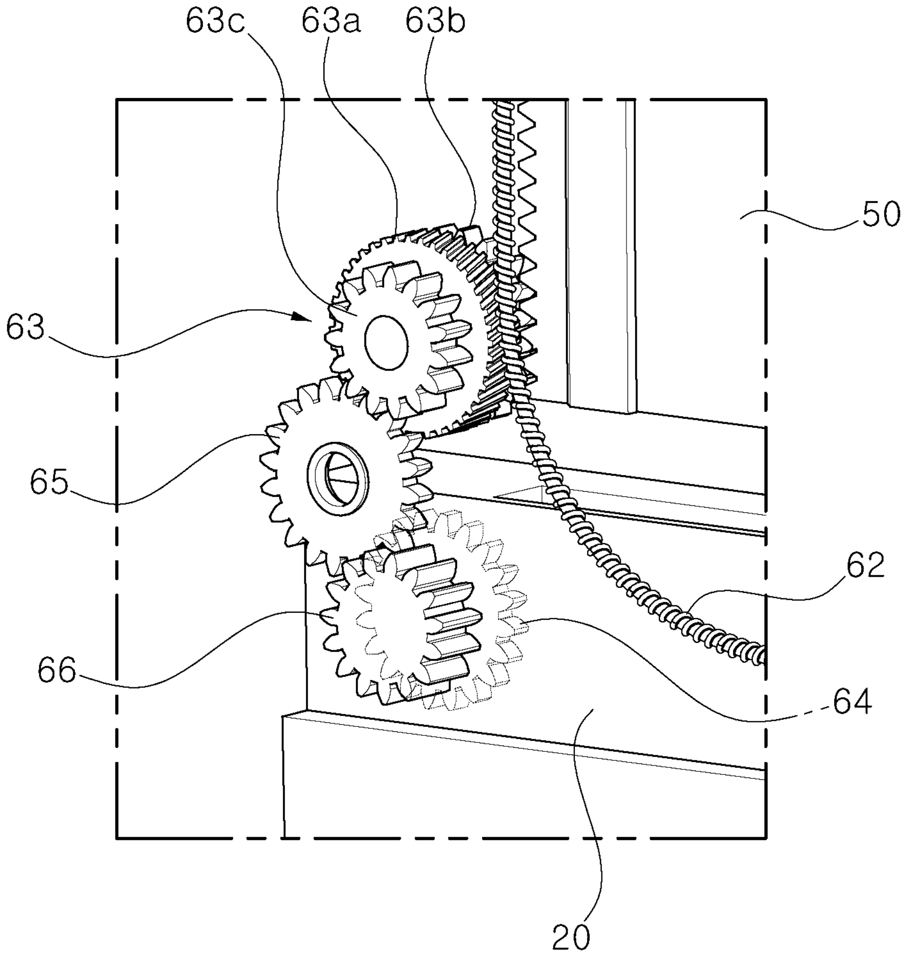

When the mid-gate 20 is closed, the second glass gears 64 may rotate together with the mid-gate 20 and engage with the respective matching gears 66 (see FIG. 6). In addition, when the mid-gate 20 is opened, the second glass gears 64 may be separated from the matching gears 66.

To this end, a matching portion 64*a* may be formed on any one of either the second glass gear 64 or the matching gear 66 and may have a tapered cross section and teeth formed along a periphery thereof. An accommodation portion 66*a* may be formed in the other of the second glass gear 64 or the matching gear 66 and may accommodate the matching portion 64*a* and engage with the matching portion 64*a*. For example, the matching portions 64*a* may be formed on the second glass gears 64 and the accommodation portions 66*a* may be formed on the matching gears 66. With the above-mentioned configuration, the second glass gears 64 may be easily separated from the matching gears 66 when the mid-gate 20 is opened and the second glass gears 64 may easily engage with the matching gears 66 when the mid-gate 20 is closed.

Gear teeth may be formed in the matching portion 64*a* or the second glass gears 64 and the accommodation portion 66*a* of the matching gears 66 so as to engage with one another. Thus, a rotational force is transmitted from each matching gear 66 to the respective second glass gear 64.

The controller 70 may be configured to operate the mid-gate regulator 30 and the back glass regulator 61 to open or close the mid-gate 20 or move the back glass 50 upward or downward.

When the user's request is input from an operation switch (not illustrated) installed at one side of the vehicle 1, the controller 70 may be configured to selectively operate only any one of the mid-gate regulator 30 or the back glass regulator 61 or to sequentially operate the mid-gate regulator 30 and the back glass regulator 61 to meet the user's request or needs. Thus, the mid-gate 20 and the back glass 50 may be operated to implement a state desired by the user. The operation switch may be installed to operate the mid-gate 20 and the back glass 50 individually or to select the mid-gate 20 and the back glass 50 for each operating mode.

Meanwhile, a mid-gate sensor 72 and a back glass sensor 71 may be respectively provided in the mid-gate regulator 30 and the back glass regulator 61 and may detect an opening/closing angle of the mid-gate 20 and a height of the back glass 50. Output values of the mid-gate sensor 72 and the back glass sensor 71 may be input to the controller 70.

An operation of the mid-gate assembly for a vehicle according to the present disclosure configured as described above is described below.

Figure 9:
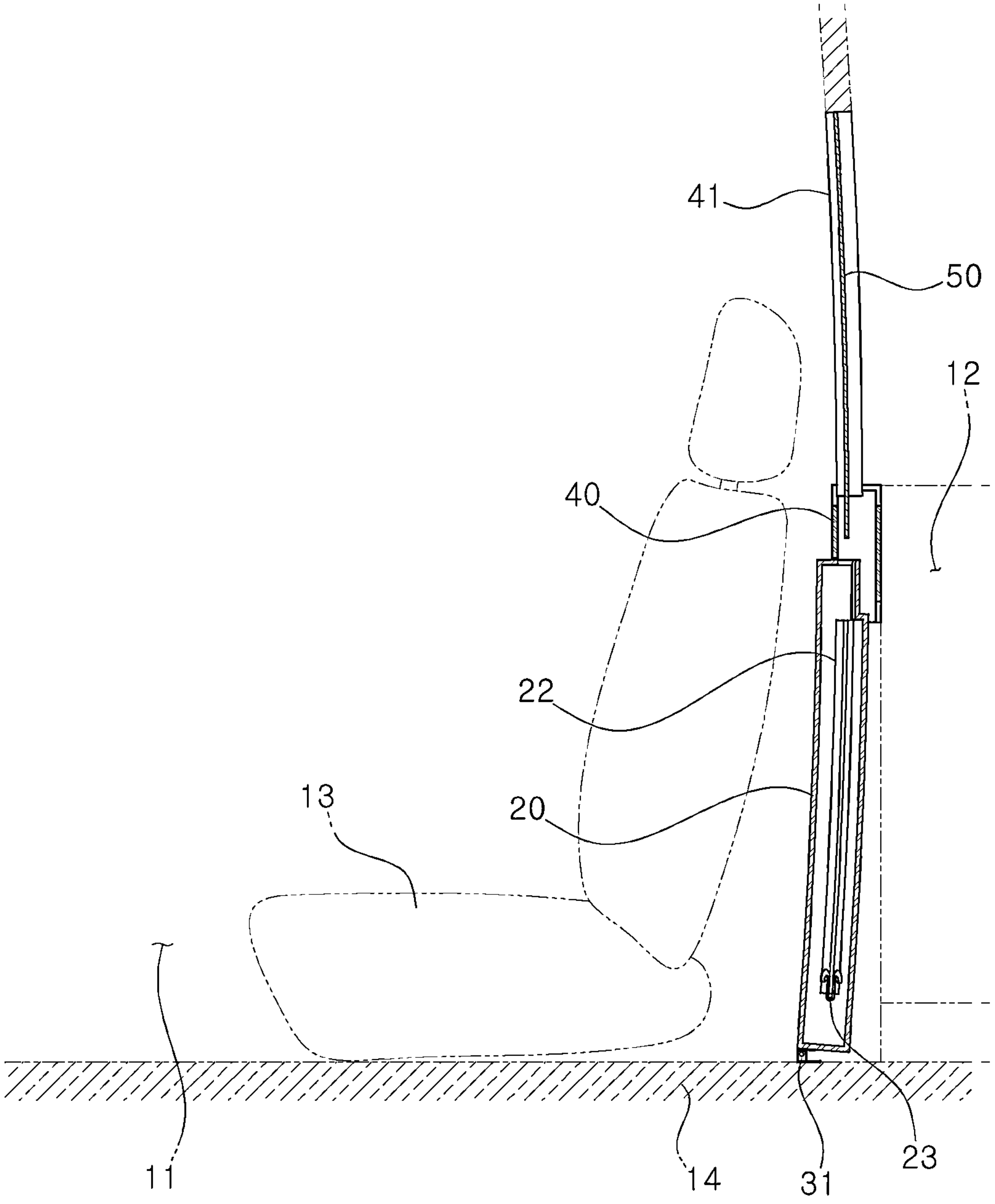
FIG. 9 is a cross-sectional view illustrating a closed state of a back glass and a mid-gate of a mid-gate assembly for a vehicle according to the present disclosure.

FIG. 9 illustrates a state in which the back glass 50 is moved upward maximally and the mid-gate 20 is closed. From this state, any one of the back glass 50 or the mid-gate 20 may be selectively opened independently or both the back glass 50 and the mid-gate 20 may be operated in accordance with the user's necessity. The back glass 50 may operate independently of the mid-gate 20. Thus, the back glass 50 and the mid-gate 20 may be operated independently or in conjunction with each other depending on the operating mode.

Figure 10:
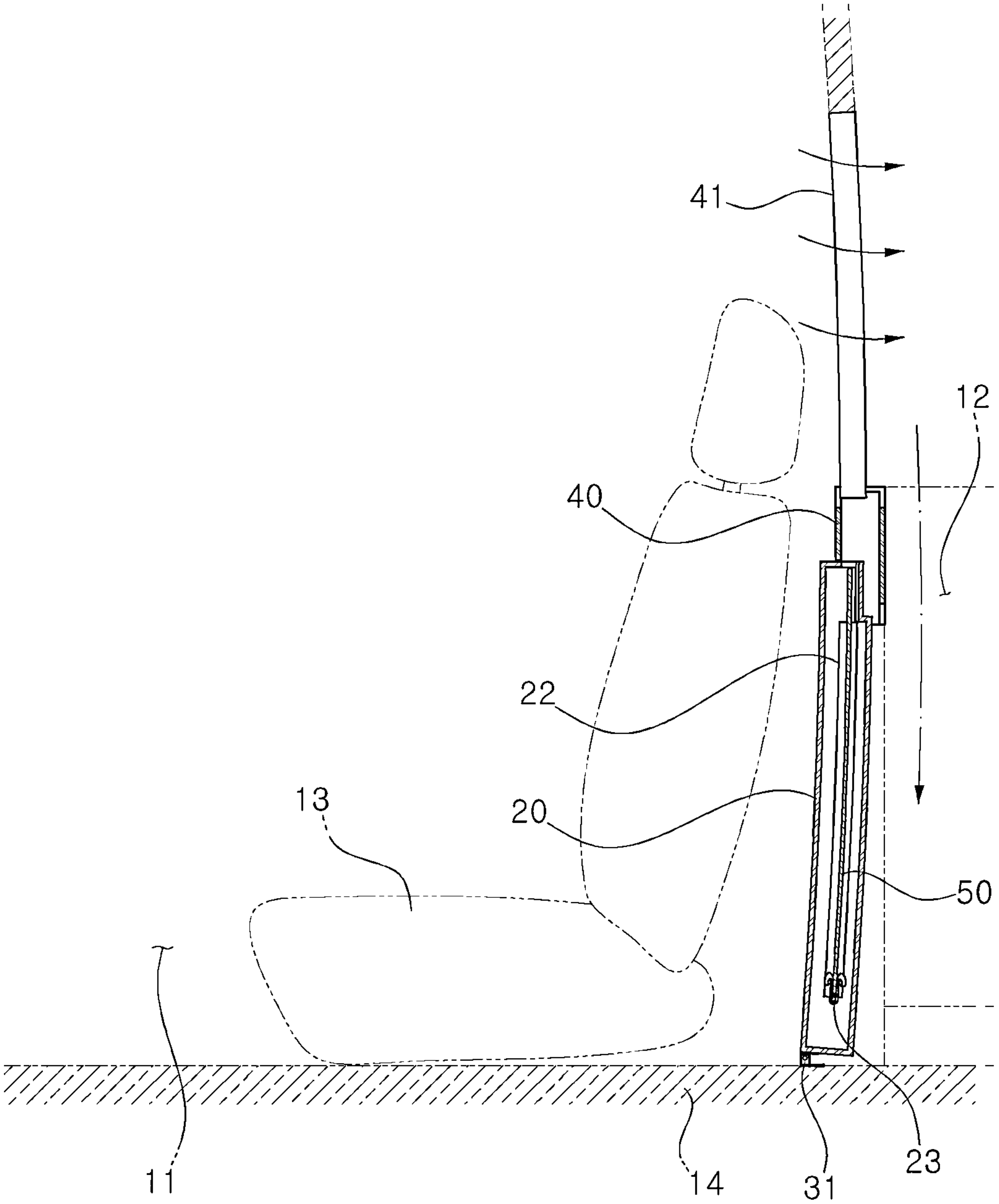
FIG. 10 is a cross-sectional view illustrating a state in which the mid-gate assembly for a vehicle according to the present disclosure is operated in a glass full-down mode.

FIG. 10 illustrates a state in which the back glass 50 is maximally moved downward and the mid-gate 20 is closed in a back glass full-down mode. Only the back glass 50 may be operated and moved downward in the glass full-down mode.

When the user intends to open the back glass 50 and manipulates the operation switch installed in the vehicle, the controller 70 may be configured to operate the back glass regulator 61 and move the back glass 50 downward.

In other words, when the back glass regulator 61 is operated, the driving cables 62 may be moved by the driving gear 61*a*. When the driving cables 62 move, the first glass gears 63 may rotate, and the first glass gears 63 may move the back glass 50 downward. In the state in which the mid-gate 20 is closed, the back glass 50 may be inserted into the slit 21 of the mid-gate 20.

Next, when the lower end of the back glass 50 is inserted into the mid-gate 20 by a predetermined distance, the lower ends of the rack gears 51 may engage with the second glass gears 64. Thereafter, the rack gears 51 may be moved downward by the first glass gears 63 and the second glass gears 64. The back glass 50 may move upward or downward between the first position at which the back glass 50 is maximally moved upward in the module frame 40 and the second position at which the back glass 50 is maximally moved downward in the mid-gate 20.

Meanwhile, FIG. 10 illustrates a state in which the back glass 50 is maximally moved downward. However, the user may move the back glass 50 downward only to a desired position by stopping manipulating the operation switch when the back glass 50 is moved partially downward to the desired position.

When the back glass 50 is maximally moved downward (see FIG. 10), the back glass 50 may be accommodated in the mid-gate 20. In addition, the lower end of the back glass 50 may be accommodated in the back glass holders 23. As described above, when the back glass 50 is maximally moved downward, the back glass sensor 71 may detect the position of the back glass 50 and the operation of the back glass regulator 61 may be stopped regardless of the user's manipulation.

Figure 11:
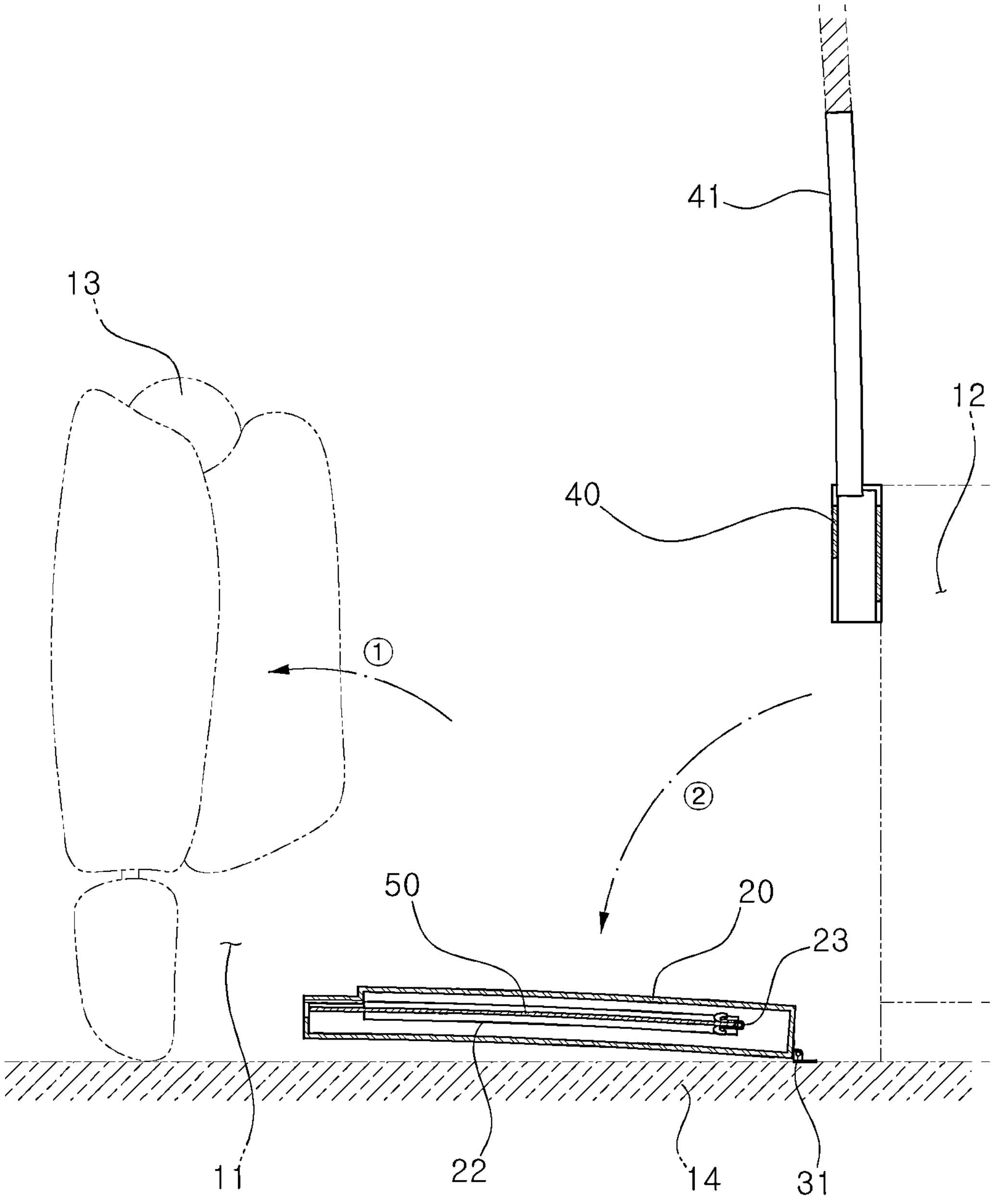
FIG. 11 is a cross-sectional view illustrating a state in which the mid-gate assembly for a vehicle according to the present disclosure is operated in a full-open mode.

FIG. 11 illustrates a state in which, in a full-open mode, the mid-gate 20 is folded downward in a state in which the back glass 50 is accommodated in the mid-gate 20. In the full-open mode, the back glass 50 may be moved downward first, and then the mid-gate 20 may be opened.

First, before the operation in the full-open mode, a second-row seat 13 in a passenger compartment may be folded (see arrow ①) to ensure a space in which the mid-gate 20 is to be accommodated. A seatback and a seat cushion of the second-row seat 13 may overlap each other and may be folded forward to ensure the space in which the mid-gate 20 is accommodated.

The user may manipulate the operation switch to move the back glass 50 downward and then may manipulate the operation switch so that the mid-gate 20 is folded. Alternatively, in case that the operation switch is configured for each mode, the controller 70 may be configured to move the back glass 50 downward and fold the mid-gate 20 only by the single manipulation.

Because the back glass 50 needs to be accommodated in the mid-gate 20, the back glass 50 may be moved downward maximally, as described with reference to FIG. 10.

Thereafter, the controller 70 may be configured to fold the mid-gate 20 accommodated in the back glass 50 (see arrow ②). In other words, the mid-gate regulator 30 may operate to fold the mid-gate 20. The controller 70 may be configured to detect a folding angle of the mid-gate 20 by means of the mid-gate sensor 72. Thus, the controller 70 may be configured to operate the mid-gate regulator 30 until the mid-gate 20 comes into contact with the floor 14.

Because the back glass 50 is in the state of being accommodated in the mid-gate 20, both the upper and lower sides of the module frame 40 may be opened when the mid-gate 20 is folded.

Because the upper side of the module frame 40 is opened, the user may maximally feel the openness between the cargo compartment and the passenger compartment.

In particular, because the lower side of the module frame 40 is opened, a part of the cargo may be accommodated in the passenger compartment 11, such that the cargo having a length longer than a length of the cargo compartment 12 may be loaded in the cargo compartment 12.

Figure 12:
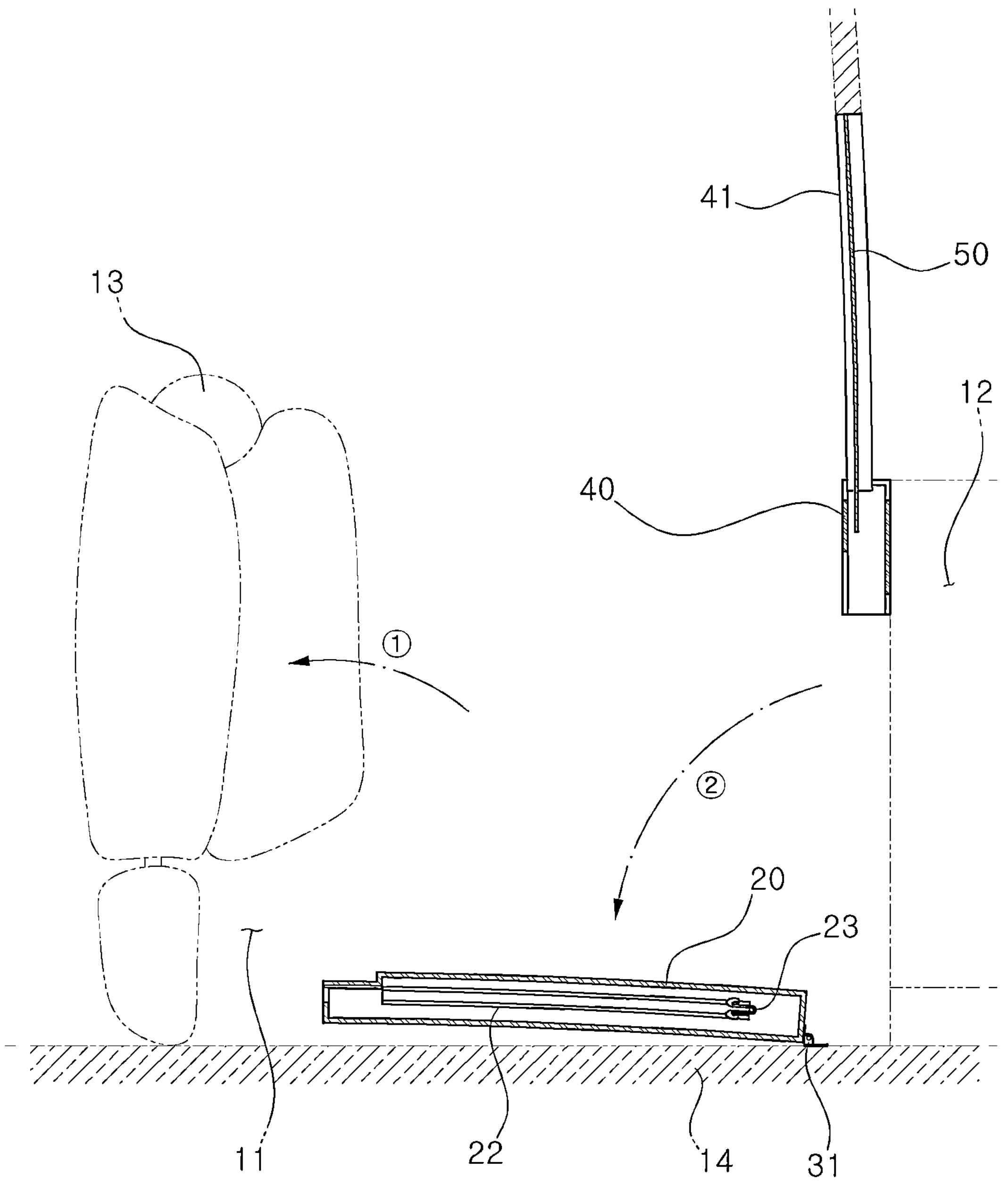
FIG. 12 is a cross-sectional view illustrating a state in which the mid-gate assembly for a vehicle according to the present disclosure is operated in a half-open mode.

FIG. 12 illustrates a state in which the operation is performed in a half-open mode. In the half-open mode, the back glass 50 may not operate, and only the mid-gate 20 may be folded.

First, as in the full-open mode, the second-row seat 13 may be folded (see arrow ①) to ensure the space in which the mid-gate 20 is to be accommodated.

First, in order to operate the mid-gate assembly in the half-open mode, the user may identify whether the lower end of the back glass 50 is positioned to be higher than the upper end of the mid-gate 20. Next, when the user manipulates the operation switch, the controller 70 be configured to operate the mid-gate regulator 30 so that only the mid-gate 20 is folded (see arrow ②).

Because the mid-gate 20 has been folded in the passenger compartment 11, the cargo having a longer length than the cargo compartment 12 may be loaded in the cargo compartment 12. In this mode, the back glass 50 covers part of the opening between the cargo and passenger compartments.

Figure 13:
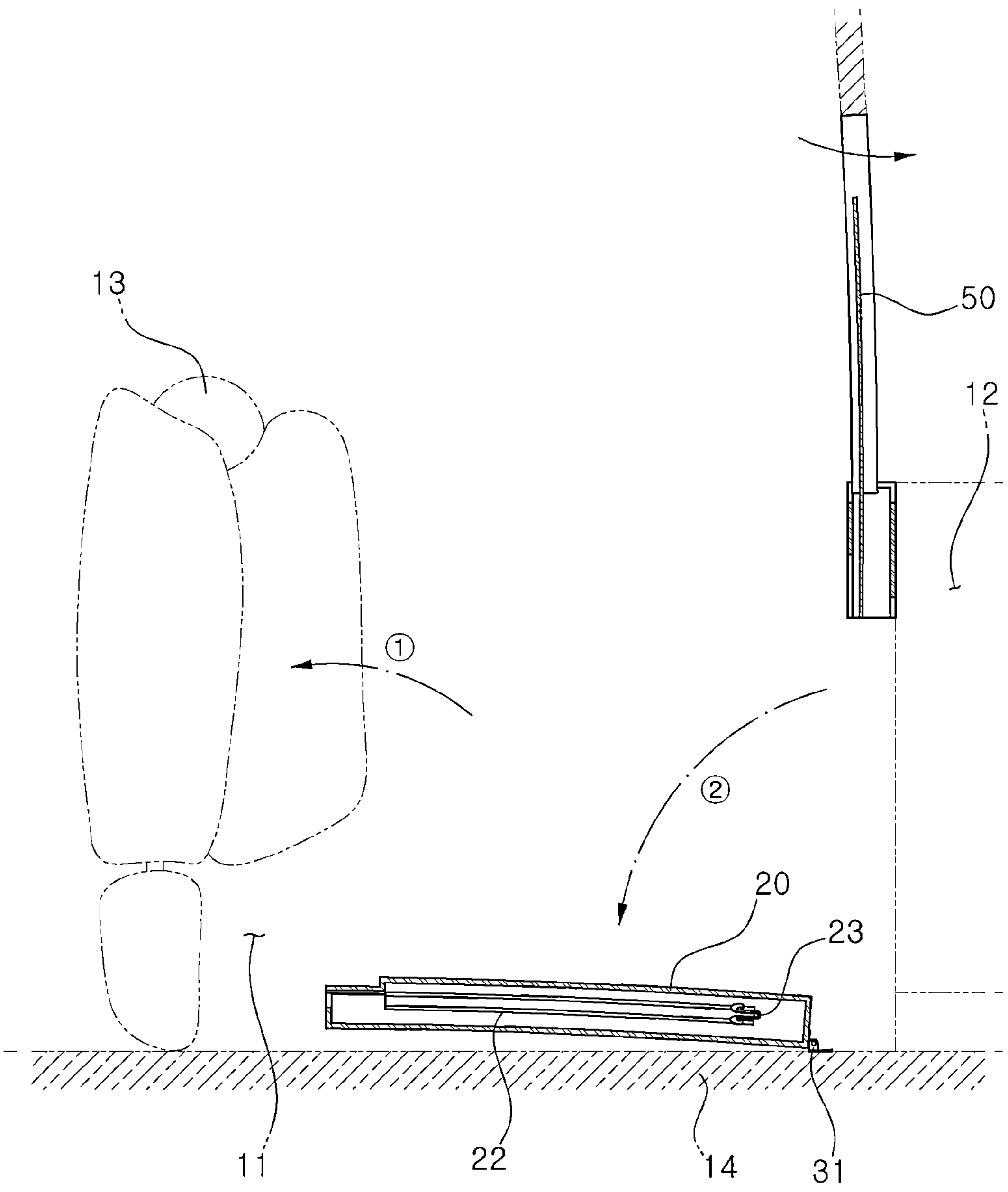
FIG. 13 is a cross-sectional view illustrating a state in which the mid-gate assembly for a vehicle according to the present disclosure is operated in an anti-buffeting mode.

FIG. 13 illustrates a state in which the operation is performed in an anti-buffeting mode. In the anti-buffeting mode, the mid-gate 20 may be folded first, and the back glass 50 may be sequentially moved downward.

When the vehicle 1 travels in the state in which the second-row seat 13 is folded (see arrow ①) and only the mid-gate 20 is opened (see arrow ②) as in the half-open mode illustrated in FIG. 11, there may occur a buffeting phenomenon in which the back glass 50 may be vibrated by air flow flowing inside and outside the vehicle 1. Alternatively, the buffeting phenomenon may occur even in a state in which the vehicle 1 travels in a state in which first-row glasses 11*a* and second-row glasses 11*b* of the passenger compartment may be partially opened together with the mid-gate 20.

The buffeting phenomenon may vibrate the glass of the vehicle 1 and cause noise and the user's unpleasantness.

In order to eliminate the buffeting phenomenon, only a part of the back glass 50 may be moved downward in the state in which the mid-gate 20 is opened, such that air also flows through an opening above the upper end of the back glass 50.

In the anti-buffeting mode, the controller 70 may be configured to move the back glass 50 downward to a predetermined height in the state in which the mid-gate 20 is opened. In this case, the controller 70 may be configured to detect the position of the back glass 50, such that the back glass 50 is moved downward until the lower end of the back glass 50 becomes coincident with the lower end of the module frame 40.

Although the present disclosure has been described as provided above in relation to specific embodiments shown in the drawings, it should be apparent to those of ordinary skill in the art that the embodiments of the present disclosure may be changed and modified in various ways without departing from the scope of the present disclosure, which is provided in the following claims.

What is claimed is:

1. A mid-gate assembly for a vehicle, the mid-gate assembly comprising:

a module frame installed between a passenger compartment and a cargo compartment of a vehicle and spaced apart from a floor of the vehicle;

a mid-gate rotatably installed on the floor and configured to close a lower side of the module frame by being rotated by a mid-gate regulator or to open the lower side of the module frame by being folded toward the floor; and a back glass installed on the module frame and the mid-gate and configured to be movable upward or downward by a back glass regulator, wherein back glass rails are installed on the module frame, accommodate two opposite ends of the back glass, and guide upward and downward movement of the back glass, wherein back glass channels are installed on the mid-gate, accommodate the two opposite ends of the back glass, and guide the upward and downward movement of the back glass when the back glass is accommodated in the mid-gate, wherein rack gears are provided at the two opposite ends of the back glass and have teeth formed in a height direction of the vehicle, wherein the rack gears are each accommodated in at least any one of the back glass rail or the back glass channel, wherein the back glass regulator is installed on the module frame, and wherein the mid-gate assembly further includes driving cables configured to be moved by the back glass regulator, first glass gears rotatably installed on the module frame and configured to be respectively rotated by movements of the driving cables and to respectively engage with the rack gears, and second glass gears rotatably installed on the mid-gate and configured to respectively engage with the rack gears and to operate in conjunction with the first glass gears.

2. The mid-gate assembly of claim 1, wherein:

the corresponding back glass rails and the back glass channels are connected to one another at the opposite ends of the back glass when the mid-gate closes the lower side of the module frame.

3. The mid-gate assembly of claim 1, further comprising:

cooperative gears installed on the module frame and configured to respectively engage with the first glass gears so that the first glass gears and the respective second glass gears rotate in the same direction; and matching gears installed on the module frame and configured to be rotated by the respective cooperative gears, wherein the matching gears are configured to respectively engage with the second glass gears when the mid-gate is closed.

4. The mid-gate assembly of claim 3, further comprising:

a matching portion on any one of each of the second glass gears or each of the matching gears, wherein each matching portion has a tapered shape and teeth along a periphery thereof; and an accommodation portion in the other of each of the second glass gears or each of the matching gears, wherein each accommodation portion accommodates a respective matching portion and engages with the respective matching portion.

5. The mid-gate assembly of claim 4, wherein the second glass gears engage with the respective matching gears when the mid-gate is closed, and wherein the second glass gears are separated from the respective matching gears when the mid-gate begins to be folded.

6. The mid-gate assembly of claim 3, wherein the first glass gears each comprise:

an input gear portion configured to engage with one of the driving cables;

an output gear portion configured to engage with a respective one of the rack gears; and a cooperative gear configured to engage with a respective one of the cooperative gears.

7. The mid-gate assembly of claim 6, wherein the driving cables have a spiral formed along a periphery thereof, and wherein the driving cables are configured to engage with a driving gear of the back glass regulator and then engage with the respective input gear portions to operate the first glass gears.

8. The mid-gate assembly of claim 7, wherein each input gear portion is provided in the form of a helical gear.

9. The mid-gate assembly of claim 1, wherein guides are provided on the module frame, respectively accommodate the driving cables, and guide movements of the driving cables.

10. The mid-gate assembly of claim 1, wherein the mid-gate is hingedly connected to the floor of the vehicle, and wherein the mid-gate is folded by the mid-gate regulator installed on the floor and opens or closes a lower side of the module frame.

11. The mid-gate assembly of claim 1, wherein a back glass holder is provided at a lower end of the mid-gate and accommodates a lower end of the back glass when the back glass is maximally moved downward.

12. The mid-gate assembly of claim 1, wherein a slit is formed at an upper end of the mid-gate so that the back glass can be inserted into the mid-gate via the slit.

13. The mid-gate assembly of claim 1, further comprising:

a controller configured to control operations of the mid-gate regulator and the back glass regulator.

14. The mid-gate assembly of claim 13, further comprising:

a mid-gate sensor configured to detect a folding angle of the mid-gate; and a back glass sensor configured to detect a height of the back glass.

15. The mid-gate assembly of claim 14, wherein, when the mid-gate is closed, the controller is configured to move the back glass upward or downward between a first position at which the back glass is maximally moved upward in the module frame and a second position at which the back glass is maximally moved downward in the mid-gate.

16. The mid-gate assembly of claim 14, wherein the controller is configured to open the mid-gate when the entire back glass is accommodated in the mid-gate or a lower end of the back glass is positioned to be higher than an upper end of the mid-gate.

17. The mid-gate assembly of claim 14, wherein, in an anti-buffeting mode in which the mid-gate is opened and the back glass is moved downward only by a predetermined height, the controller is configured to move the back glass downward so that the lower end of the back glass is coincident with a lower end of the module frame.

18. A vehicle, comprising:

the passenger compartment;

the cargo compartment where a cargo is loaded; and the mid-gate assembly according to claim 1 positioned to separate the passenger compartment and the cargo compartment.

19. A mid-gate assembly for a vehicle, the mid-gate assembly comprising:

a module frame installed between a passenger compartment and a cargo compartment of a vehicle and spaced apart from a floor of the vehicle;

a mid-gate rotatably installed on the floor and configured to close a lower side of the module frame by being rotated by a mid-gate regulator or to open the lower side of the module frame by being folded toward the floor;

a back glass installed on the module frame and the mid-gate and configured to be movable upward or downward by a back glass regulator;

a controller configured to control operations of the mid-gate regulator and the back glass regulator;

a mid-gate sensor configured to detect a folding angle of the mid-gate; and a back glass sensor configured to detect a height of the back glass, wherein, in an anti-buffeting mode in which the mid-gate is opened and the back glass is moved downward only by a predetermined height, the controller is configured to move the back glass downward so that the lower end of the back glass is coincident with a lower end of the module frame.

* * * * *